(12) United States Patent
Jung

(10) Patent No.: US 9,804,406 B2
(45) Date of Patent: Oct. 31, 2017

(54) STEREOSCOPIC IMAGE DISPLAY DEVICE

(71) Applicant: LG DISPLAY CO., LTD., Seoul (KR)

(72) Inventor: Sungmin Jung, Incheon (KR)

(73) Assignee: LG Display Co., Ltd., Seoul (KR)

( * ) Notice: Subject to any disclaimer, the term of this patent is extended or adjusted under 35 U.S.C. 154(b) by 6 days.

(21) Appl. No.: 14/324,810

(22) Filed: Jul. 7, 2014

(65) Prior Publication Data

US 2014/0320470 A1 Oct. 30, 2014

Related U.S. Application Data

(63) Continuation of application No. 12/631,151, filed on Dec. 4, 2009, now abandoned.

(30) Foreign Application Priority Data

May 29, 2009 (KR) .................... 10-2009-0047680

(51) Int. Cl.
*G02B 27/26* (2006.01)
*G02B 27/22* (2006.01)
(Continued)

(52) U.S. Cl.
CPC ......... *G02B 27/26* (2013.01); *G02B 27/2242* (2013.01); *G02B 27/2264* (2013.01);
(Continued)

(58) Field of Classification Search
CPC ...... G02B 27/26; G02B 27/28; G02B 27/281; H04N 13/0434; H04N 13/0438; G02F 1/133528
(Continued)

(56) References Cited

U.S. PATENT DOCUMENTS 4,719,507 A * 1/1988 Bos .................... H04N 13/0434
348/57
5,175,638 A 12/1992 Kanemoto et al.
(Continued)

FOREIGN PATENT DOCUMENTS

CN 101359099 A 2/2009
JP 3-134648 6/1991
(Continued)

OTHER PUBLICATIONS

Korean Office Action in counterpart Korean Application No. 10-2009-0047680, dated Nov. 5, 2012.
(Continued)

*Primary Examiner* — Audrey Y Chang
(74) *Attorney, Agent, or Firm* — Morgan, Lewis & Bockius LLP

(57) ABSTRACT

This document discloses a stereoscopic image display device. In the image display device, a display device displays a first image data and a second image data in a time-dividing manner. A switchable retarder panel is configured to control light emitted from the display device and is made of electrically controlled birefringence (ECB) liquid crystals. Polarization glasses polarize the light emitted from the switchable retarder panel. The polarization glasses comprise a left eyeglass comprising a polarizer having a tilt of 45° about a light absorbing axis, and a right eyeglass comprising a polarizer having a tilt of 135° about the light absorbing axis.

3 Claims, 13 Drawing Sheets

(51) Int. Cl.
*H04N 13/04* (2006.01)
*G09G 3/36* (2006.01)

(52) U.S. Cl.
CPC ....... *G09G 3/3614* (2013.01); *H04N 13/0434* (2013.01); *H04N 13/0454* (2013.01); *H04N 13/0497* (2013.01); *H04N 13/0438* (2013.01)

(58) Field of Classification Search
USPC ............... 359/462, 465; 348/58, 59; 345/87; 349/15
See application file for complete search history.

(56) References Cited

U.S. PATENT DOCUMENTS

| | | | |
|---|---|---|---|
| 5,686,975 A | 11/1997 | Lipton | |
| 6,046,787 A | 4/2000 | Nishiguchi | |
| 6,437,915 B2 * | 8/2002 | Moseley | G02B 27/26 348/51 |
| 6,734,923 B2 * | 5/2004 | Kwon | G02F 1/133528 348/E13.038 |
| 7,724,223 B2 * | 5/2010 | Kurosawa | G09G 3/3611 345/87 |
| 2004/0135740 A1 | 7/2004 | Sato et al. | |
| 2006/0268407 A1 | 11/2006 | Fergason et al. | |

FOREIGN PATENT DOCUMENTS

| | | |
|---|---|---|
| JP | 7-234379 | 9/1995 |
| JP | 10232365 A | 9/1998 |
| JP | 10253824 A | 9/1998 |
| WO | 01/18589 A1 | 3/2001 |

OTHER PUBLICATIONS

Chinese Office Action dated Nov. 23, 2011, and English translation.
United Kingdom Office Action dated Jun. 13, 2011.

* cited by examiner

< Odd frame >

< Even frame >

| t=0 | t1 | t2 | | tN-1 | 1Tf | | | | | 2Tf | | | |
|---|---|---|---|---|---|---|---|---|---|---|---|---|---|
| 0 | 1 | 1 | ... | 1 | 1 | 1 | 0 | 0 | ... | 0 | 0 | 0 | 1 | 1 | ... |
| 0 | 0 | 1 | ... | 1 | 1 | 1 | 1 | 0 | ... | 0 | 0 | 0 | 0 | 1 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 0 | 1 | 1 | 1 | 1 | ... | 1 | 0 | 0 | 0 | 0 | ... |
| 0 | 0 | 0 | ... | 0 | 0 | 1 | 1 | 1 | ... | 1 | 1 | 0 | 0 | 0 | ... |

STEREOSCOPIC IMAGE DISPLAY DEVICE

This application is a continuation of U.S. patent application Ser. No. 12/631,151, filed on Dec. 4, 2009, which claims the benefit of Korean patent application Ser. No. 2009-0047680 filed on May 29, 2009, the entire disclosure of each of which is hereby incorporated by reference for all purposes.

BACKGROUND

Field

This document relates to a stereoscopic image display device.

Related Art

Techniques for stereoscopic image display devices are classified into a stereoscopic technique and an autostereoscopic technique.

The stereoscopic technique uses parallax images of the left and right eyes having a high three-dimensional effect and comprises a stereoscopic method and an autostereoscopic method both of which are being put to practical use. The stereoscopic method is used to display the left and right parallax images on a direct-view display device or a projector in a time-division manner or by changing the polarization directions of the left and right parallax images and to implement a stereoscopic image using the polarization glasses or the liquid crystal shutter glasses. In the autostereoscopic method, in general, a polarizing plate, such as a parallax barrier for separating the optical axes of the left and right parallax images, is placed in front or at the rear of a display screen.

In the stereoscopic method, a switchable retarder panel for converting the light which is incident on the polarization glasses into a polarized light, can be placed over the display device. The stereoscopic method is used to alternately display a left-eye image and a right-eye image on the display device and to convert the light which is incident on the polarization glasses into a polarized light, using the switchable retarder panel. Accordingly, the stereoscopic method can implement a stereoscopic image without a reduction in resolution by time-dividing the left-eye image and the right-eye image. A conventional 3-D image display device using the stereoscopic method is, however, problematic in that it has residual retardation when converting the emitted light to a polarized light using the switchable retarder panel. Accordingly, there is a need for improvements of the conventional 3-D image display device because such residual retardation causes leakage of light in one of the polarization glasses.

SUMMARY

An aspect of this document is to provide a stereoscopic image display device, comprising a display device configured to display a first image data and a second image data in a time-dividing manner, a switchable retarder panel configured to control light emitted from the display device and made of electrically controlled birefringence (ECB) liquid crystals, and polarization glasses configured to polarize the light emitted from the switchable retarder panel. The polarization glasses comprise a left eyeglass comprising a polarizer having a tilt of 45° about a light absorbing axis, and a right eyeglass comprising a polarizer having a tilt of 135° about the light absorbing axis.

Another aspect of this document is to provide a stereoscopic image display device, comprising a display device configured to display a first image data and a second image data in a time-dividing manner, a switchable retarder panel configured to control light emitted from the display device and made of ECB liquid crystals, and polarization glasses configured to polarize the light emitted from the switchable retarder panel. The polarization glasses comprise a left eyeglass comprising a half-wave plate having a tilt of 0° about a slow phase axis and a polarizer having a tilt of 135° about a light absorbing axis, and a right eyeglass comprising a polarizer having a tilt of 135° about the light absorbing axis.

Yet another aspect of this document is to provide a stereoscopic image display device, comprising a display device configured to display a first image data and a second image data in a time-dividing manner, a switchable retarder panel configured to control light emitted from the display device and made of ECB liquid crystals, and polarization glasses configured to polarize the light emitted from the switchable retarder panel. The polarization glasses comprise a left eyeglass comprising a quarter-wave plate having a tilt of 0° about a slow phase axis and a polarizer having a tilt of 135° about a light absorbing axis, and a right eyeglass comprising a quarter-wave plate having a tilt of 0° about the slow phase axis and a polarizer having a tilt of 45° about the light absorbing axis.

Yet another aspect of this document is to provide a stereoscopic image display device, comprising a display device configured to display a first image data and a second image data in a time-dividing manner, a switchable retarder panel configured to control light emitted from the display device and made of ECB liquid crystals, and polarization glasses configured to polarize the light emitted from the switchable retarder panel. The polarization glasses comprise a left eyeglass comprising a quarter-wave plate having a tilt of 0° about a slow phase axis and a polarizer having a tilt of 135° about a light absorbing axis, and a right eyeglass comprising a quarter-wave plate having a tilt of 90° about the slow phase axis and a polarizer having a tilt of 135° about the light absorbing axis.

Yet another aspect of this document is to provide a stereoscopic image display device, comprising a display device configured to display a first image data and a second image data in a time-dividing manner, a switchable retarder panel configured to control light emitted from the display device and made of ECB liquid crystals, and polarization glasses configured to polarize the light emitted from the switchable retarder panel. The polarization glasses comprise a left eyeglass comprising a quarter-wave plate having a tilt of 90° about a slow phase axis and a polarizer having a tilt of 45° about a light absorbing axis, and a right eyeglass comprising a quarter-wave plate having a tilt of 90° about the slow phase axis and a polarizer having a tilt of 135° about the light absorbing axis.

Yet another aspect of this document is to provide a stereoscopic image display device, comprising a display device configured to display a first image data and a second image data in a time-dividing manner, a switchable retarder panel configured to control light emitted from the display device and made of ECB liquid crystals, and polarization glasses configured to polarize the light emitted from the switchable retarder panel. The polarization glasses comprise a left eyeglass comprising a quarter-wave plate having a tilt of 90° about a slow phase axis, a half-wave plate having a tilt of 0° about the slow phase axis, and a polarizer having a tilt of 135° about a light absorbing axis, and a right eyeglass comprising a quarter-wave plate having a tilt of 90° about the slow phase axis and a polarizer having a tilt of 135° about the light absorbing axis.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

Reference will now be made in detail to embodiments of this document examples of which are illustrated in the accompanying drawings.

Hereinafter, one or more implementations of this document are described in detail.

Figure 1:
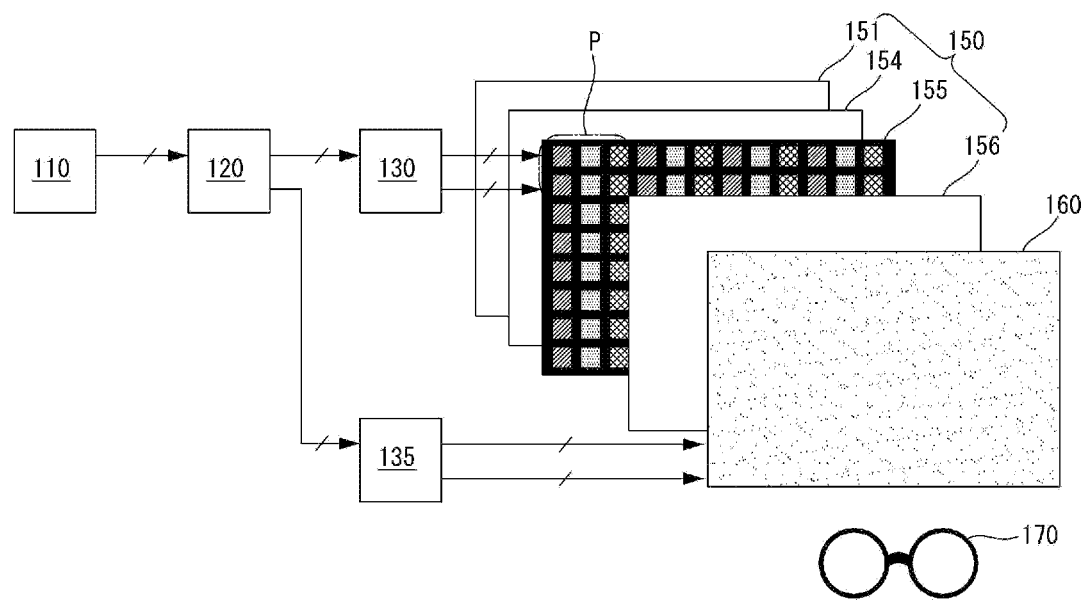
FIG. 1 shows a schematic configuration of a stereoscopic image display device according to an exemplary embodiment of this document.
Figure 2:
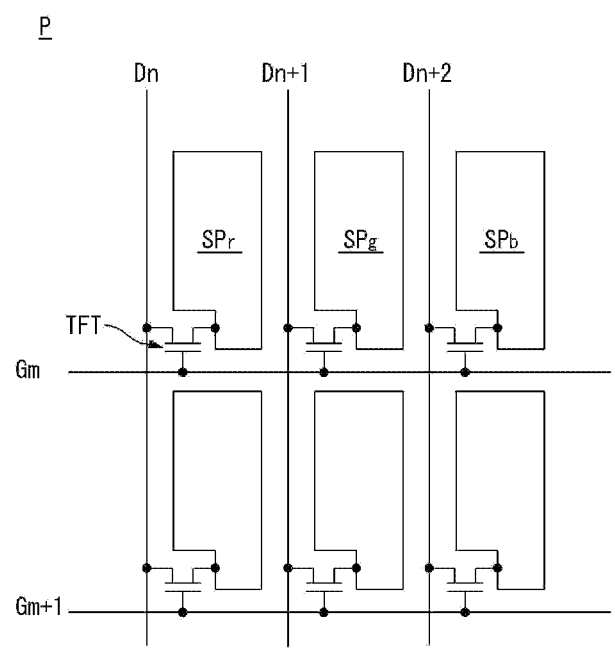
FIG. 2 is a diagram showing the subpixels of a display device shown in FIG. 1.
Figure 3:
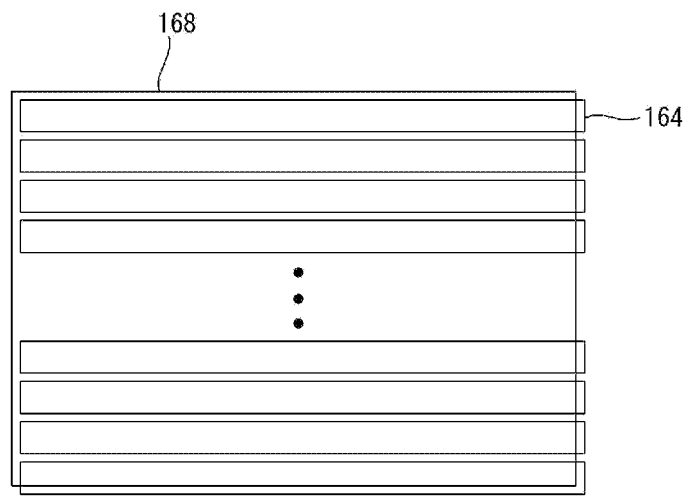
FIG. 3 is a diagram showing the electrodes of a switchable retarder panel shown in FIG. 1.

Referring to FIGS. 1 to 3, a stereoscopic image display device according to an exemplary embodiment of this document comprises an image supply unit 110, a control unit 120, a first driving unit 130, a second driving unit 135, a display device 150, a switchable retarder panel 160, and polarization glasses 170.

The image supply unit 110 is configured to supply the control unit 120 with image data having a two-dimensional (2-D) format in the 2-D mode and right and left image data having a three-dimensional (3-D) format in the 3-D mode. Further, the image supply unit 110 is configured to supply the control unit 120 with timing signals, such as a vertical sync signal Vsync, a horizontal sync signal Hsync, a data enable signal DE, a main clock, and a low voltage GND. The image supply unit 110 selects the 2-D mode or the 3-D mode according to user choice through a user interface. The user interface may comprise user input means, such as an on-screen display (OSD), a remote controller, a keyboard, or a mouse. The image supply unit 110 may divide the image data into right-eye image data and left-eye image data, which have the 3-D format, according to a left-eye image and a right-eye image which are displayed in the display device 150 and may encode the divided image data.

The control unit 120 is configured to supply the display device 150 with first image data and second image data. The first image data may be selected as left-eye image data, and the second image data may be selected as right-eye image data. The control unit 120 is configured to supply the first driving unit 130 with the image data which is received from the image supply unit 110 in the form of a frame frequency of 60×n (where n is a positive integer of 2 or more) Hz. In the 3-D mode, the control unit 120 alternately supplies the first driving unit 130 with the left-eye image data and the right-eye image data. The control unit 120 multiplies the frame frequency of an input image n times in order to increase the frequency of a timing control signal for controlling the operating timings of the first and second driving units 130 and 135. Further, the control unit 120 controls the second driving unit 135 such that voltages of scan lines 164 formed in the switchable retarder panel 160 change from a first driving voltage to a second driving voltage according to a line at which a left-eye image and a right-eye image are changed in the display device 150.

The first driving unit 130 comprises a data driving circuit connected to data lines Dn, . . . , Dn+2 and a gate driving circuit connected to gate lines Gm and Gm+1. The data driving circuit converts digital video data which is received from the control unit 120 into positive/negative polarity analog video data voltages and supplies the converted voltages to the data lines Dn, . . . , Dn+2, under the control of the control unit 120. The gate driving circuit sequentially supplies a gate pulse (or a scan pulse) to the gate lines Gm and Gm+1 under the control of the control unit 120.

The second driving unit 135 shifts a switching voltage Von or Voff which is supplied to the scan lines 164 according to the boundary of the left-eye image data and the right-eye image data in the display device 150. The second driving unit 135 may be implemented using a multiplexer array for selecting the switching voltage Voff which is synchronized with the left-eye image data displayed in the display device 150 and positive/negative polarity voltages +Von/−Von which are synchronized with the right-eye image data displayed in the display device 150 under the control of the control unit 120. Alternatively, the second driving unit 135 may be implemented using a shift register, a level shifter for shifting the output of the shift register to the switching voltage Voff and the positive/negative polarity voltages +Von/−Von, and so on. Alternatively, the second driving unit 135 may be implemented using any kind of an analog to digital circuit which is able to sequentially supply the switching voltage Voff and the positive/negative polarity voltages +Von/−Von to the scan lines 164 of the switchable retarder panel 160.

The display device 150 displays the first image data during an $N^{th}$ (where N is a positive integer) frame period and the second image data during an $(N+1)^{th}$ frame period. The display device 150 may be implemented using a liquid crystal display (LCD). The display device 150 comprises a thin film transistor (hereinafter referred to as a 'TFT') substrate and a color filter substrate. A liquid crystal layer is formed between the TFT substrate and the color filter substrate. The data lines Dn, . . . , Dn+2 and the gate lines Gm and Gm+1 are formed on the rear glass substrate of the TFT substrate so that they are orthogonal to each other. Further, subpixels SPr, SPg, and SPb which are defined by the data lines Dn, . . . , Dn+2 and the gate lines Gm and Gm+1 are formed in a matrix form on the rear glass substrate. A TFT is formed at the intersection of each of the data lines Dn, . . . , Dn+2 and the gate lines Gm and Gm+1 supplies the pixel electrode of a liquid crystal cell with a data voltage that is supplied via the data lines Dn, . . . , Dn+2 in response to the scan pulse received from the gate line Gm. To this end, the gate electrode of the TFT is connected to the gate line Gm, and the source electrode of the TFT is connected to the data line Dn. The drain electrode of the TFT is connected to the pixel electrode of the liquid crystal cell. A common voltage is supplied to a common electrode that is opposite to the pixel electrode. The color filter substrate comprises black matrices and a color filter which are formed on the front glass substrate of the TFT. The common electrode is formed on the front glass substrate in a vertical electric field driving method, such as a twisted nematic (TN) mode and a vertical alignment (VA) mode, and is formed on the rear glass substrate along with the pixel electrode in a horizontal electric field driving method, such as an in-plane switching (IPS) mode and a fringe field switching (FFS) mode. Polarizing plates 154 and 156 are attached to the front and rear glass substrates of the display device 150, respectively. An orientation film for determining a pre-tilt angle of a liquid crystal is formed in each of the polarizing plates 154 and 156 of the display device 150. The front polarizing plate 156 has a light absorbing axis, which is equal to the light absorbing axis of the left-eye polarizing filter of the polarization glasses 170, and determines the polarization characteristic of light which is incident on the switchable retarder panel 160 along the light absorbing axis. The rear polarizing plate 154 determines the polarization characteristic of light which is incident on the display device 150. Spacers for maintaining the cell gap of the liquid crystal layer are formed between the front glass substrate and the rear glass substrate of the display device 150. The liquid crystal mode of the display device 150 may comprise any kind of a liquid crystal mode as well as the TN mode, the VA mode, the IPS mode, or the FFS mode. Further, the display device 150 may be implemented using any kind of a liquid crystal display device, such as a transmissive liquid crystal display device, a semi-transmissive liquid crystal display device, or a reflective liquid crystal display device. The transmissive liquid crystal display device and the semi-transmissive liquid crystal display device require a backlight unit 151, as shown in FIG. 1. The above-described display device 150 is configured to output linearly polarized light or circularly polarized light.

The switchable retarder panel 160 is configured to convert light which is received from the display device 150 into first polarized light in response to the first driving voltage during the $N^{th}$ frame period and to convert light which is received from the display device 150 into second polarized light in response to the second driving voltage during the $(N+1)^{th}$ frame period. To this end, the switchable retarder panel 160 comprises a front glass substrate (or a transparent substrate) and a rear glass substrate (or a transparent substrate) which are opposite to each other with the liquid crystal layer intervened therebetween. The common electrode 168 is formed in the front glass substrate, and the scan lines 164 classified into a plurality of groups are formed in the rear glass substrate in a traverse stripe pattern. The scan lines 164 formed in the switchable retarder panel 160 are classified into some groups and arranged in the same direction so that they have a correspondence relation of 1:N stages (where N is an even number) for the gate lines Gm and Gm+1 which are formed in the display device 150. For example, assuming that the number of gate lines Gm and Gm+1 of the display device 150 is 1080 and the number of scan lines 164 of the switchable retarder panel 160 is 90, one scan line is formed to correspond to twelve gate lines. The liquid crystal layer formed between the rear glass substrate and the front glass substrate is made of electrically controlled birefringence (ECB) liquid crystals which have a half-wave plate ($\lambda/2$) optical axis characteristic when the scan lines 164 are in an off state. A common voltage, having an equipotential as the common voltage which is supplied to the common electrode of the display device 150, is supplied to the common electrode 168. The switching voltage Voff, having an equipotential as the common voltage supplied to the common electrode 168, is supplied to the scan lines 164 before (or after) the right-eye image (or the left-eye image) is displayed in lines of the display device 150 which are opposite to the scan lines 164. The positive/negative polarity voltages +Von/−Von, having a potential difference with the common voltage supplied to the common electrode 168, are alternately supplied to the scan lines 164 before (or after) the right-eye image (or the left-eye image) is displayed in lines of the display device 150 which are opposite to the scan lines 164. Accordingly, the switching on or off voltage having a three-step voltage level is supplied to the scan lines 164 such that an observer can see the right and left-eye images displayed in the display device 150 through the polarization glasses 170. The positive/negative polarity voltages +Von/−Von which are generated on the basis of the common voltage function to prevent the liquid crystals from being deteriorated because of a DC voltage. The common voltage supplied to the common electrode of the display device 150 and the common voltage Vcom or the switching voltage Voff which is supplied to the common electrode 168 and the scan lines 164 of the switchable retarder panel 160 may be set to 7.5 V, the positive polarity voltage +Von supplied to the scan lines 164 of the switchable retarder panel 160 may be set to 15 V, and the negative polarity voltage −Von supplied to the scan lines 164 of the switchable retarder panel 160 may be set to 0 V.

The polarization glasses 170 comprise a left eyeglass and a right eyeglass having different light absorbing axes such that the polarization characteristic of the left eye differ from the polarization characteristic of the right eye. The polarization glasses 170 may have a one-layer structure comprising only a polarizer, a two-layer structure comprising a compensation plate (the compensation plate represents A-Plate) and a polarizer, a two-layer structure comprising a wave plate and a polarizer, or a three-layer structure comprising wavelength plates and a polarizer according to the structure of the display device 150 and the switchable retarder panel 160.

Hereinafter, an exemplary operation of the stereoscopic image display device and scanning methods using the display device and the switchable retarder panel are schematically described, and the polarization glasses are then described in more detail.

Figure 4:
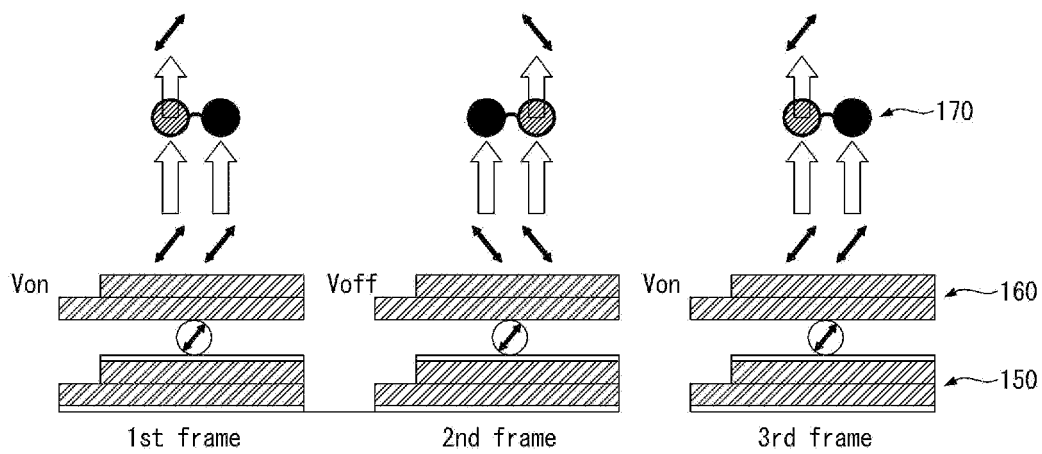
FIG. 4 is a diagram showing examples of 3-D mode operations of the stereoscopic image display device according to an exemplary embodiment of this document.

FIG. 4 is a diagram showing, on a frame basis (first to third frames), how the left and right-eye images which have passed through the display device 150 and the switchable retarder panel 160 can be seen through the polarization glasses 170. The display device 150 alternately displays the left and right-eye images in the 3-D mode and transmits light of the left and right-eye images via the front polarizing plate 156 as left polarized light. When the switching voltage Voff is supplied to the scan lines 164, the switchable retarder panel 160 delays the phase of the left polarized light which is received from the display device 150 by 90° and transmits right polarized light toward the polarization glasses 170. When the positive/negative polarity voltages +Von/−Von are supplied to the scan lines 164, the switchable retarder panel 160 transmits the left polarized light which is received from the display device 150 without phase delay. Accordingly, assuming that the display device 150 and the switchable retarder panel 160 are driven at the frame frequency of 120 Hz, the left-eye image is displayed in the display device 150 during odd-numbered frame periods and the right-eye image is displayed in the display device 150 during even-numbered frame periods. Thus, an observer who wears the polarization glasses 170 can see the left-eye image through his left eye during odd-numbered frame periods and the right-eye image through his right eye during even-numbered frame periods. The above left polarized light may be any one of vertical linearly polarized light (or a horizontal linearly polarized light) and left circularly polarized light (or right circularly polarized light) or may be any one of horizontal linearly polarized light (or vertical linearly polarized light) and right circularly polarized light (or horizontal linearly polarized light) which have an optical axis intersecting the optical axis of right polarized light. Meanwhile, the display device 150 displays an image of a 2-D format in the 2-D mode. When the display device 150 displays an image of a 2-D format, an observer can see the 2-D image by taking off the polarization glasses 170.

Figure 5:
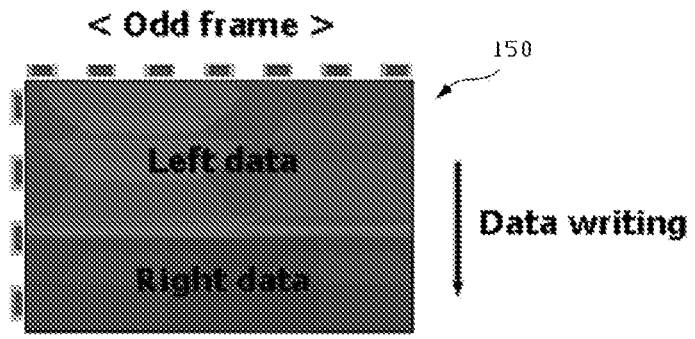
FIGS. 5 and 6 are diagrams illustrating a scanning method using the display device and the switchable retarder panel.
Figure 5:
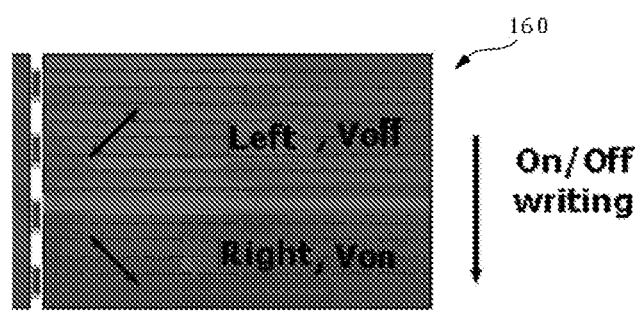
Figure 6:
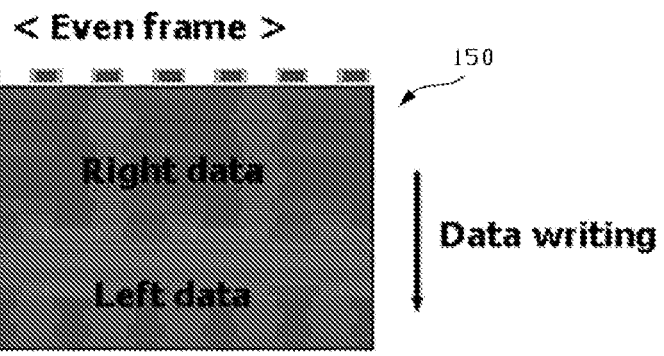
Figure 6:
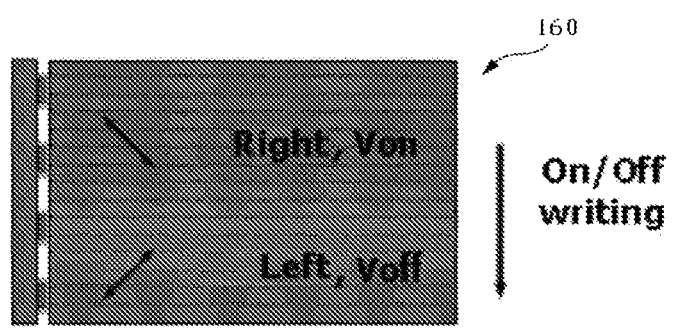

Referring to FIGS. 5 and 6, the display device 150 sequentially writes the data of the left-eye image on a line basis in the 3-D mode. Here, the display device 150 sequentially writes the data of the right-eye image on a line basis in a next frame period. Before the writing of the left-eye image (or the right-eye image), the liquid crystal cells maintain the data of the right-eye image (or the left-eye image) which has been charged in a previous frame period.

Figures 7, 8:
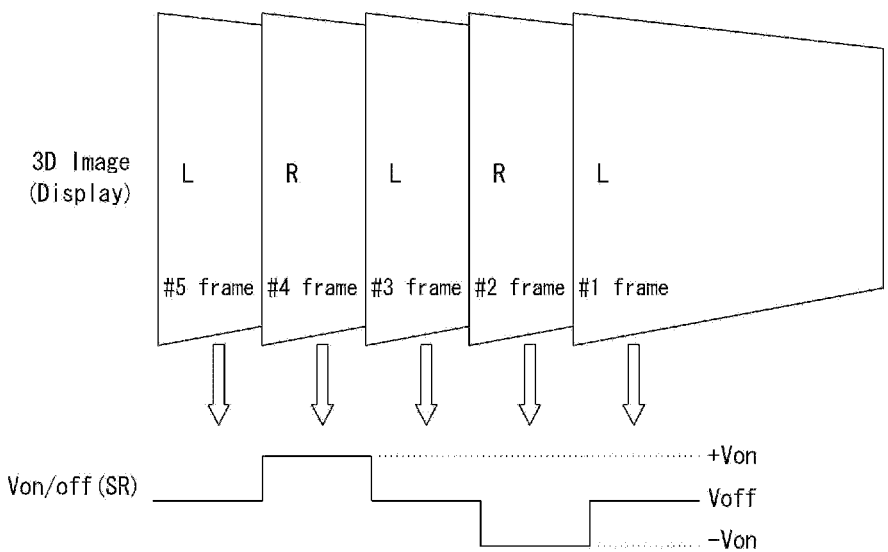
FIG. 7 is a table showing changes in the logical values of a control signal for controlling voltages which are supplied to the scan lines of the switchable retarder panel.
FIG. 8 is a diagram showing voltages which are supplied to the scan lines of the switchable retarder panel in response to left and right-eye images displayed on the display device.

The second driving unit 135 controls voltages which are supplied to the scan lines 164 of the switchable retarder panel 160 under the control of the first control unit 120, as in the logic table shown in FIG. 7. In FIG. 7, '0' indicates the switching voltage Voff which is supplied to the scan lines 164 in synchronization with a data scan time of the left-eye image that is written into the display device 150. '1' indicates the positive/negative polarity voltages +Von/−Von which are supplied to the scan lines 164 in synchronization with a data scan time of the right-eye image that is written into the display device 150.

In FIG. 7, the lines of the table correspond to the respective scan lines 164 of the switchable retarder panel 160, and 't=0, . . . , 2TF,' at the top of the table indicate the lapse of time. In FIG. 7, at '1Tf', the switching voltage Voff is supplied to all the scan lines 164, comprising the first scan line at the top of the table and the last scan line at the bottom of the table. If the right-eye image is scanned into the display device 150 starting from the first scan line, the positive/negative polarity voltages +Von/−Von start being supplied to the scan lines 164 line by line in the scan direction. Accordingly, the voltages supplied to the scan lines 164 change from the switching voltage Voff to the positive/negative polarity voltages +Von/−Von along a line at which an image displayed in the display device 150 changes from a left-eye image to a right-eye image. Further, the voltages supplied to the scan lines 164 change from the positive/negative polarity voltages +Von/−Von to the switching voltage Voff along a line at which an image displayed in the display device 150 changes from a right-eye image to a left-eye image. A case where data of the left-eye image is first displayed is taken as an example in the above description. It is, however, to be noted that, if data of the right-eye image is first displayed, the voltages supplied to the scan lines 164 may differ from those of the above example.

In FIG. 8, 'Von/Voff (SR)' indicates polarized switching voltage which is supplied to turn on or off the scan lines 164 of the switchable retarder panel 160. As in FIG. 8, in order to convert the light which is generated by the left-eye image displayed in the display device 150 into a polarized light, the switching voltage Voff is supplied to the scan lines 164 of the switchable retarder panel 160. On the other hand, in order to convert the light which is generated by the right-eye image displayed in the display device 150 into a polarized light, the positive/negative polarity voltages +Von/−Von are supplied to the scan lines 164 of the switchable retarder panel 160. Thus, an observer may feel ortho-stereoscopy resulting from binocular disparity through the polarization glasses 170 because of such an operating characteristic of the display device 150 and the switchable retarder panel 160.

As described above, the stereoscopic image display device according to the exemplary embodiment of this document comprises the display device 150 implemented using a liquid crystal display (LCD), the switchable retarder panel 160 made of ECB liquid crystals and configured to control light emitted from the display device 150, and the polarization glasses 170 configured to polarize the light emitted from the switchable retarder panel 160. Here, the switchable retarder panel 160, as described above, is made of ECB liquid crystals.

Figure 9:
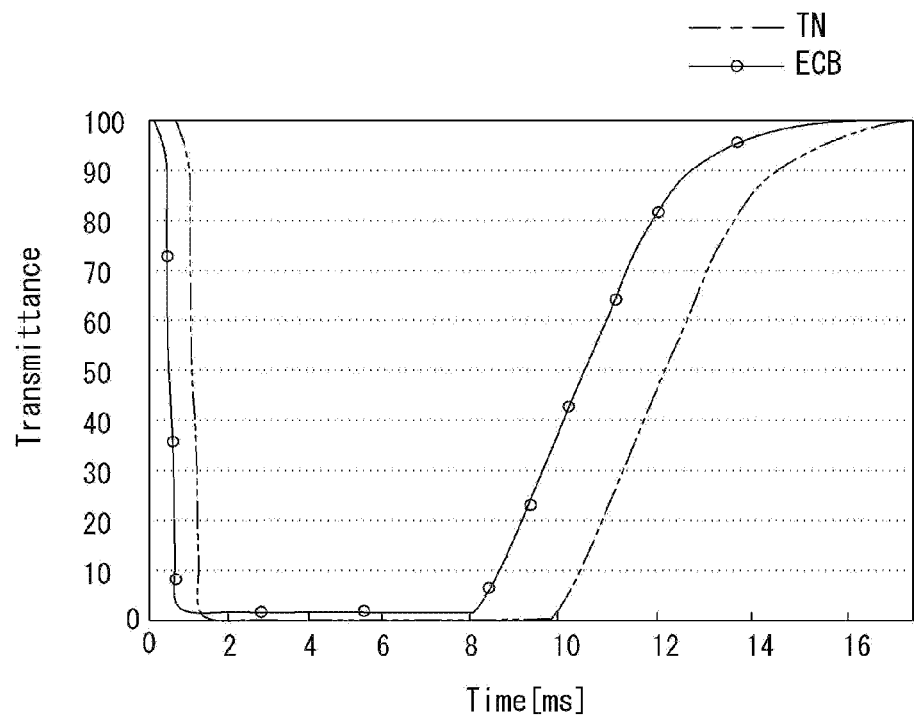
FIG. 9 is a graph illustrating changes in transmittance versus response time of a conventional switchable retarder panel and of the switchable retarder panel according to the exemplary embodiment of this document.

Referring to FIG. 9, it can be seen that the switchable retarder panel 160 made of ECB liquid crystals as in the exemplary embodiment does not have response time delay upon turn-off as compared with a conventional switchable retarder panel made of TN liquid crystals. Accordingly, the exemplary embodiment can improve the response time because it uses the switchable retarder panel 160 made of ECB liquid crystals. However, the switchable retarder panel 160 made of ECB liquid crystals may also have residual retardation in an on state. This is described below with reference to the drawings.

Figure 10:
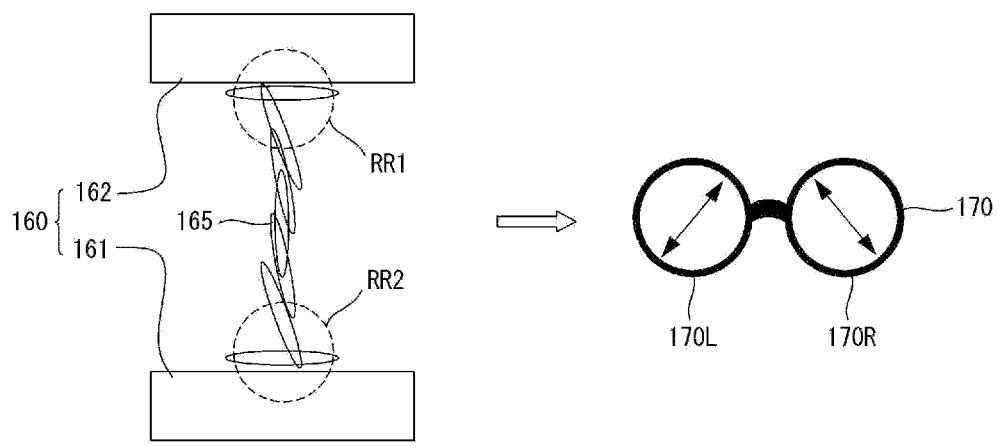
FIG. 10 is a diagram illustrating that residual retardation is generated in a switchable retarder panel made of electrically controlled birefringence (ECB) liquid crystals.

Referring to FIG. 10, the liquid crystal layer 165 placed within the switchable retarder panel 160 made of ECB liquid crystals is turned on or off while being rotated in response to voltages applied to the scan lines and the common electrode. In an on state, the switchable retarder panel 160 has residual retardation because liquid crystals is located at the position of "RR1" and "RR2" Where liquid crystals are not easy to be moved corresponding the direction of the driving voltage. Here, the reason why the liquid crystals causing such residual retardation are generated is that, when the liquid crystals are formed, a small number of the liquid crystals are adjacent to an orientation film having the property of catching the liquid crystals. The liquid crystals may exist in places other than the position of "RR1" and "RR2." If such residual retardation occurs, leakage of light is caused in one of the polarization glasses 170. Accordingly, the exemplary embodiment sets up the polarization glasses 170 having the following structure on the basis of the structural conditions of the display device 150 and the switchable retarder panel 160 in order to deal with the leakage of light caused by the residual retardation.

<First Exemplary Embodiment>

Figure 11:
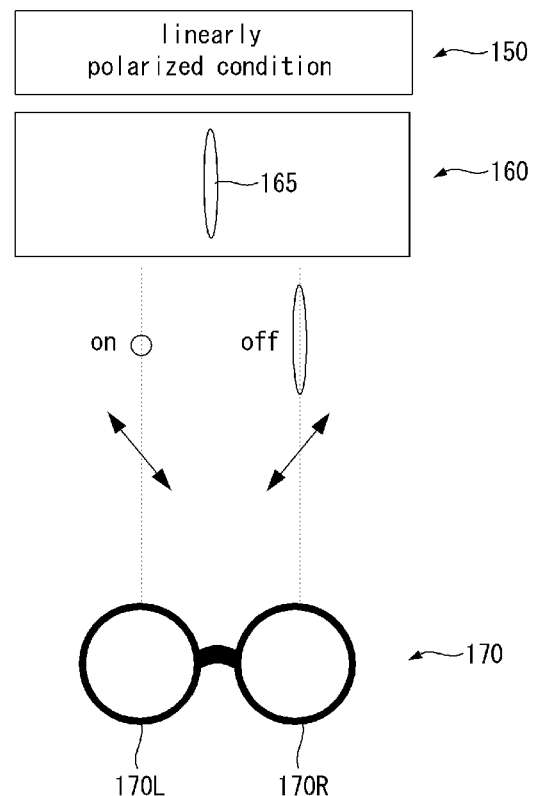
FIG. 11 is a diagram illustrating the polarization direction of light which is emitted from the switchable retarder panel when the display device emits linearly polarized light.

Referring to FIG. 11, the first exemplary embodiment of this document has set up a condition of the polarization glasses 170 in the case where the display device 150 is configured to output linearly polarized light and the switchable retarder panel 160 is made of ECB liquid crystals.

In FIG. 11, when the switchable retarder panel 160 is in an on state, light emitted from the switchable retarder panel 160 is polarized in the direction of a left polarized-light axis. When the switchable retarder panel 160 is in an off state, light emitted from the switchable retarder panel 160 is polarized in the direction of a right polarized-light axis. Here, reference numeral 165 indicates the rubbing direction of the ECB liquid crystals formed in the switchable retarder panel 160. In the case where the direction of final light emitted from the switchable retarder panel 160 is set up as described above, a left eyeglass 170L and a right eyeglass 170R constituting the polarization glasses 170 may be configured as follows.

Figure 12:
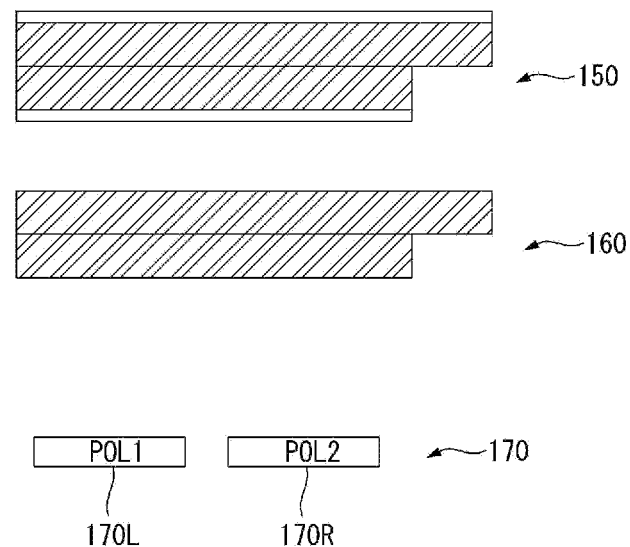
FIG. 12 is a diagram showing the structure of polarization glasses according to a first exemplary embodiment of this document.

The polarization glasses 170, as shown in FIG. 12, comprises the left eyeglass 170L comprising a polarizer POL1 having a tilt of 45° about a light absorbing axis and the right eyeglass 170R comprising a polarizer POL2 having a tilt of 135° about the light absorbing axis.

Figure 13:
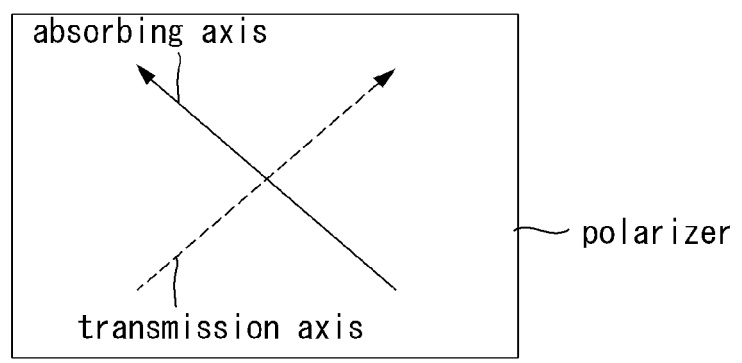
FIG. 13 is a diagram shown to help understanding of the absorbing axis and the transmissive axis of a polarizer and the slow phase axis and the high-speed axis of a uniaxial film.
Figure 13:
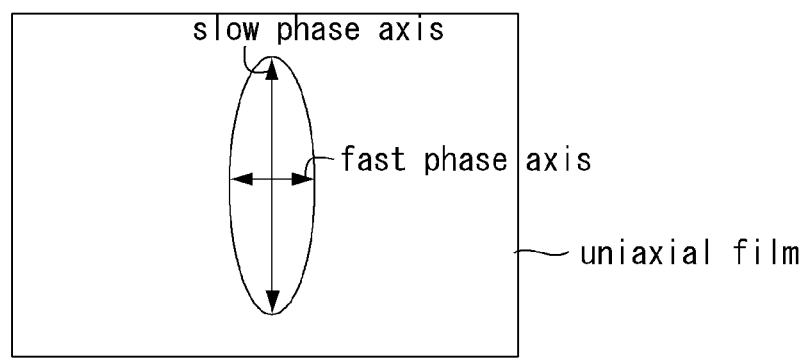

FIG. 13 shows the absorbing axis and the transmissive axis of a polarizer and the slow phase axis and the high-speed axis of a uniaxial film. The polarizer is a device for converting unpolarized light or arbitrarily polarized light into light of a single polarization state. Here, the absorbing axis of the polarizer functions to absorb incident light so that the incident light does not pass through the polarizer, and the transmissive axis of the polarizer functions to transmit incident light. The uniaxial film has an optical axis in one direction and converts linearly polarized light into circularly polarized light. Here, the slow phase axis of the uniaxial film is vertical to the direction of liquid crystals, and the high-speed axis of the uniaxial film is orthogonal to the slow phase axis.

<Second Exemplary Embodiment>

Figure 14:
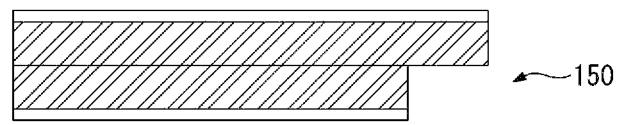
FIGS. 14 and 15 are diagrams showing a construction of polarization glasses according to a second exemplary embodiment of this document.
Figure 14:
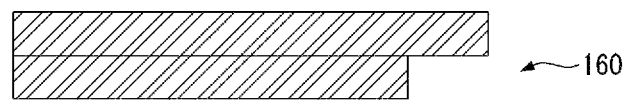
Figure 14:
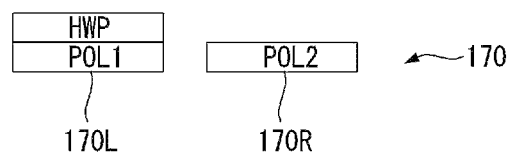
Figure 15:
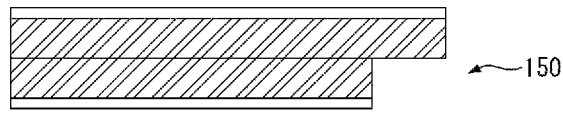
Figure 15:
Figure 15:
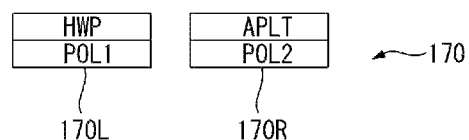

Referring to FIGS. 14 and 15, the second exemplary embodiment of this document may have, for example, a condition in which, as in the first exemplary embodiment, the display device 150 is configured to emit linearly polarized light and the switchable retarder panel 160 is made of ECB liquid crystals.

The polarization glasses 170, as shown in FIG. 14, may comprise the left eyeglass 170L configured to comprise a half-wave plate HWP having a tilt of 0° about a slow phase axis and a polarizer POL1 having a tilt of 135° about a light absorbing axis and the right eyeglass 170R configured to comprise a polarizer POL2 having a tilt of 135° about the light absorbing axis. Here, the reason why the half-wave plate HWP written into the left eyeglass 170L is to set up the slow phase axis of the half-wave plate HWP so that it is orthogonal to the polarized light in an off state of the switchable retarder panel 160. In more detail, leakage of light is generated due to a wavelength dispersion property because the liquid crystals of the switchable retarder panel 160 are aligned in a vertical direction. In order to compensate for the leakage of light, the slow phase axis of the half-wave plate HWP is set up in such a way as to be orthogonal to an off state of the switchable retarder panel 160.

In an alternative embodiment, the polarization glasses 170, as shown in FIG. 15, may comprise the left eyeglass 170L configured to comprise a polarizer POL1 having a tilt of 135° about a light absorbing axis and a half-wave plate HWP on the polarizer POL1 having a tilt of 0° about a slow phase axis, and the right eyeglass 170R configured to comprise a polarizer POL2 having a tilt of 135° about the light absorbing axis and a compensation plate APLT on the polarizer POL2 having a tilt of 0° about the slow phase axis.

<Third Exemplary Embodiment>

Figure 16:
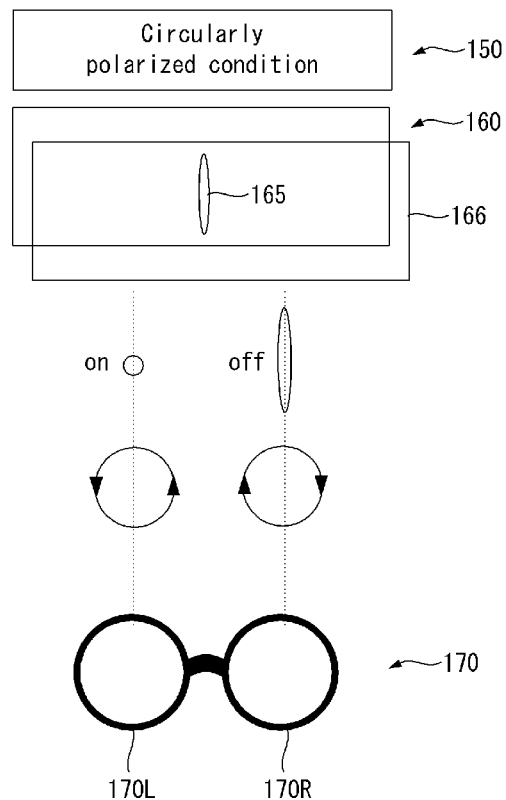
FIG. 16 is a diagram illustrating the polarization direction of light which is emitted from the switchable retarder panel when the display device emits circularly polarized light.

Referring to FIG. 16, the third exemplary embodiment has set up a condition of the polarization glasses 170 in the case where the display device 150 is configured to emit circularly polarized light and the switchable retarder panel 160 is made of ECB liquid crystals. In the case where light emitted from the display device 150 has a circularly polarized light condition, a quarter-wave plate 166 is attached in a direction where the switchable retarder panel 160 emits light.

In FIG. 16, when the switchable retarder panel 160 is in an on state, light emitted from the switchable retarder panel 160 is polarized in the direction of left polarized light. When the switchable retarder panel 160 is in an off state, light emitted from the switchable retarder panel 160 is polarized in the direction of right polarized light. Here, reference numeral 165 indicates the rubbing direction of the ECB liquid crystals which are formed in the switchable retarder panel 160. If the direction of final light emitted from the switchable retarder panel 160 is set up as described above, the left eyeglass 170L and the right eyeglass 170R constituting the polarization glasses 170 may be configured as follows.

The polarization glasses 170, as shown in FIG. 16, may comprise the left eyeglass 170L configured to comprise a quarter-wave plate QWP1 having a tilt of 0° about a slow phase axis and a polarizer POL1 having a tilt of 135° about a light absorbing axis and the right eyeglass 170R configured to comprise a quarter-wave plate QWP2 having a tilt of 0° about the slow phase axis, a compensation plate APLT having a tilt of 0° about the slow phase axis, and a polarizer POL2 having a tilt of 45° about the light absorbing axis.

Figure 17:
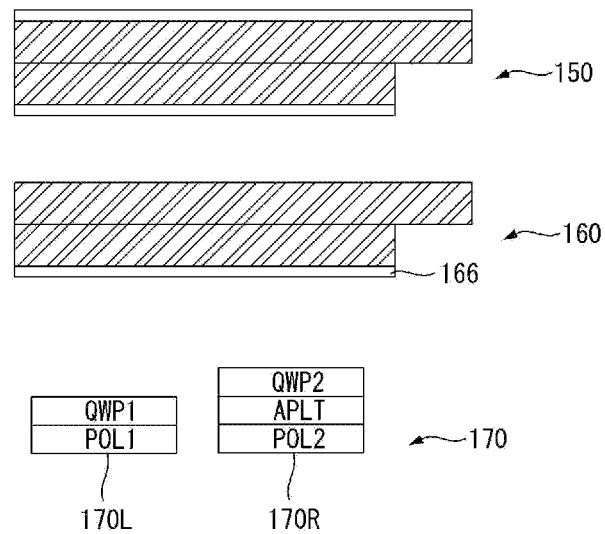
FIGS. 17 to 20 are diagrams showing a construction of polarization glasses according to a third exemplary embodiment of this document.
Figure 18:
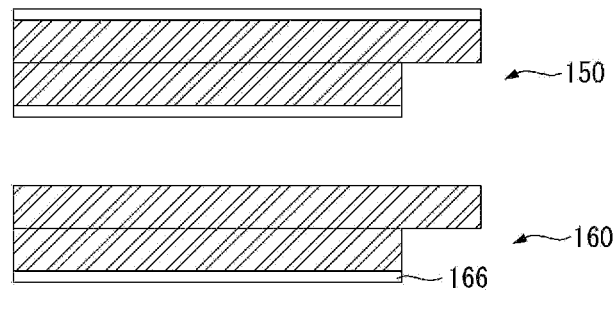

In an alternative embodiment, the polarization glasses 170, as shown in FIG. 18, may comprise the right eyeglass 170R, comprising a quarter-wave plate QWP2 having a tilt of 0° about the slow phase axis and a polarizer POL2 having a tilt of 45° about the light absorbing axis, in the state in which the left eyeglass 170L has the same construction as FIG. 17.

Figure 19:
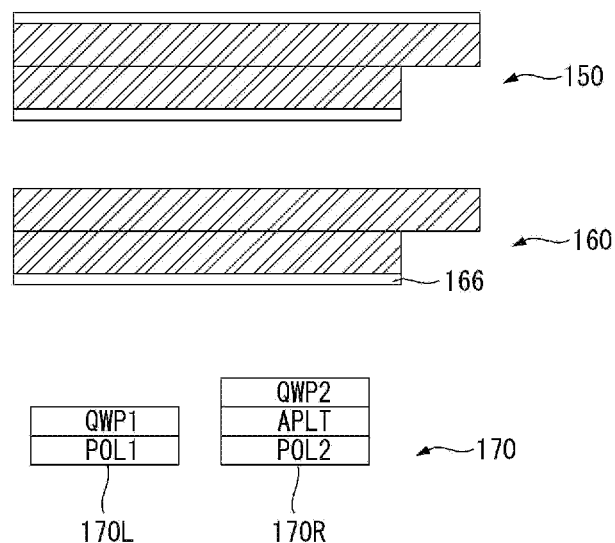

In another alternative embodiment, the polarization glasses 170, as shown in FIG. 19, may comprise the right eyeglass 170R, comprising a quarter-wave plate QWP2 having a tilt of 90° about the slow phase axis, a compensation plate APLT having a tilt of 0° about the slow phase axis, and a polarizer POL2 having a tilt of 135° about the light absorbing axis, in the state in which the left eyeglass 170L has the same construction as FIG. 17.

Figure 20:
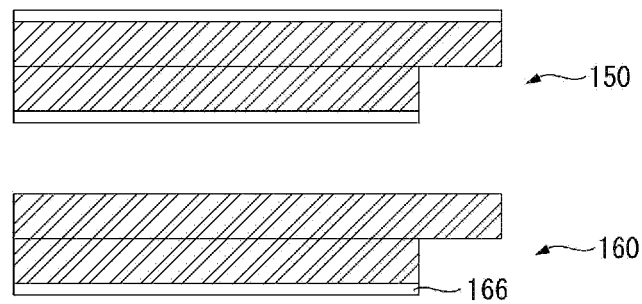
Figure 20:
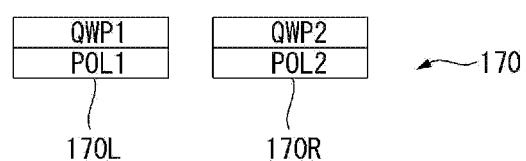

In yet another alternative embodiment, the polarization glasses 170, as shown in FIG. 20, may comprise the right eyeglass 170R, comprising a quarter-wave plate QWP2 having a tilt of 90° about the slow phase axis and a polarizer POL2 having a tilt of 135° about the light absorbing axis, in the state in which the left eyeglass 170L has the same construction as FIG. 17.

<Fourth Exemplary Embodiment>

Figure 21:
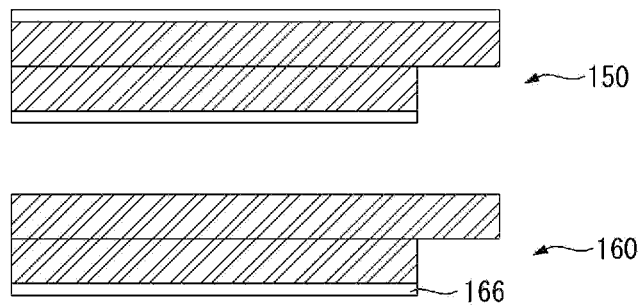
FIGS. 21 and 22 are diagrams showing a construction of polarization glasses according to a fourth exemplary embodiment of this document.
Figure 21:
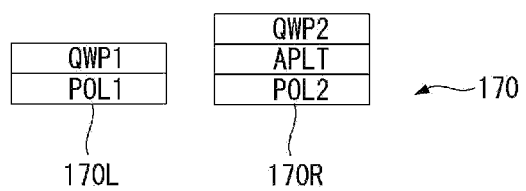
Figure 22:
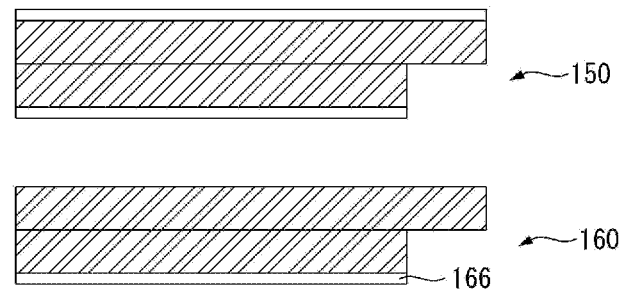
Figure 22:
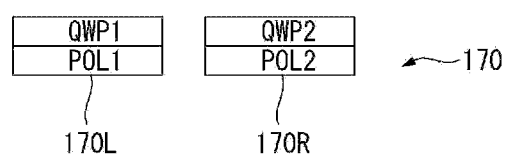

Referring to FIGS. 21 and 22, the fourth exemplary embodiment of this document illustrates a case where, as in the third exemplary embodiment, the display device 150 is configured to emit circularly polarized light and the switchable retarder panel 160 is made of ECB liquid crystals. In the case where the direction of final light emitted from the switchable retarder panel 160 is set up as described above, the left eyeglass 170L and the right eyeglass 170R constituting the polarization glasses 170 may be configured as follows.

The polarization glasses 170, as shown in FIG. 21, may comprise the left eyeglass 170L configured to comprise a quarter-wave plate QWP1 having a tilt of 90° about a slow phase axis and a polarizer POL1 having a tilt of 45° bout a light absorbing axis and the right eyeglass 170R configured to comprise a quarter-wave plate QWP2 having a tilt of 90° about the slow phase axis, a compensation plate APLT having a tilt of 0° about the slow phase axis, and a polarizer POL2 having a tilt of 135° about the light absorbing axis.

In an alternative embodiment, the polarization glasses 170, as shown in FIG. 22, may comprise the right eyeglass 170R, comprising a quarter-wave plate QWP2 having a tilt of 90° about the slow phase axis and a polarizer POL2 having a tilt of 135° about the light absorbing axis in the state in which the left eyeglass 170L has the same construction as FIG. 21.

<Fifth Exemplary Embodiment>

Figure 23:
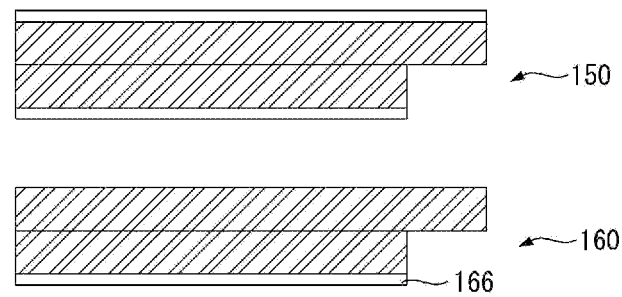
FIGS. 23 and 24 are diagrams showing a construction of polarization glasses according to a fifth exemplary embodiment of this document.
Figure 23:
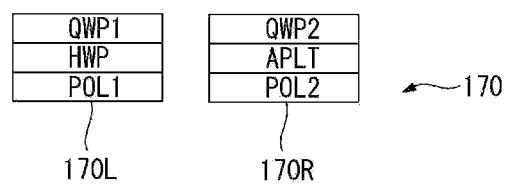
Figure 24:
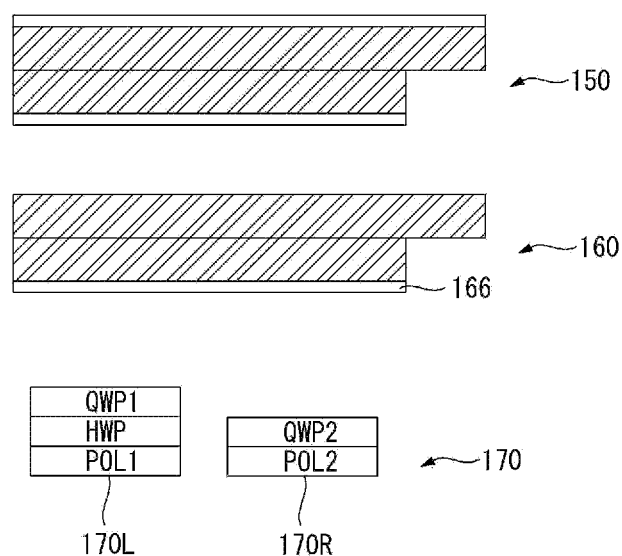

Referring to FIGS. 23 and 24, the fifth exemplary embodiment of this document illustrates a case where, as in the third exemplary embodiment, the display device 150 is configured to emit circularly polarized light and the switchable retarder panel 160 is made of ECB liquid crystals. In the case where the direction of final light emitted from the switchable retarder panel 160 is set up as described above, the left eyeglass 170L and the right eyeglass 170R constituting the polarization glasses 170 are configured as follows.

The polarization glasses 170, as shown in FIG. 23, may comprise the left eyeglass 170L configured to comprise a quarter-wave plate QWP1 having a tilt of 90° about a slow phase axis, a half-wave plate HWP having a tilt of 0° about the slow phase axis, and a polarizer POL1 having a tilt of 135° about a light absorbing axis and the right eyeglass 170R configured to comprise a quarter-wave plate QWP2 having a tilt of 90° about the slow phase axis, a compensation plate APLT having a tilt of 0° about the slow phase axis, and a polarizer POL2 a tilt of 135° about the light absorbing axis.

In an alternative embodiment, the polarization glasses 170, as shown in FIG. 24, may comprise the right eyeglass 170R, comprising a quarter-wave plate QWP2 having a tilt of 90° about the slow phase axis and a polarizer POL2 having a tilt of 135° about the light absorbing axis, in the state in which the left eyeglass 170L has the same construction as FIG. 23.

The structure of the polarization glasses 170 which has been configured as described above so that it can deal with leakage of light resulting from residual retardation can be represented by the following table. In Table 1, a symbol "—" means that there is no layer.

TABLE 1

| | | | CONDITION OF POLARIZATION GLASSES (SHEET CONSTRUCTION) | | |
|---|---|---|---|---|---|
| Embodiment | Condition | Glasses | Layer 1 (about slow phase axis) | Layer 2 (about slow phase axis) | POL1, 2 (about light absorbing axis) |
| First embodiment | linearly polarized light | left eyeglass | — | — | 45° |
| | | right eyeglass | — | — | 135° |
| Second embodiment | linearly polarized light | left eyeglass | HWP(0°) | — | 135° |
| | | right eyeglass | — | — | 135° |
| | | | APLT(0°) | — | 135° |
| Third embodiment | circularly polarized light | left eyeglass | QWP1(0°) | — | 135° |
| | | right eyeglass | QWP2(0°) | APLT(0°) | 45° |
| | | | QWP2(0°) | — | 45° |
| | | | QWP2(90°) | APLT(0°) | 135° |
| | | | QWP2(90°) | — | 135° |
| Fourth embodiment | circularly polarized light | left eyeglass | QWP1(90°) | — | 45° |
| | | right eyeglass | QWP2(90°) | APLT(0°) | 135° |
| | | | QWP2(90°) | — | 135° |
| Fifth embodiment | circularly polarized light | left eyeglass | QWP2(90°) | HWP(0°) | 135° |
| | | right eyeglass | QWP2(90°) | APLT(0°) | 135° |
| | | | QWP2(90°) | — | 135° |

This document has an advantage in that it can provide the stereoscopic image display device capable of preventing leakage of light which is generated in one of polarization glasses due to residual retardation of light emitted through the switchable retarder panel. Further, this document is advantageous in that it can provide the stereoscopic image display device capable of reducing a crosstalk level, occurring when displaying a 3-D image, through the improvements of the response time using the switchable retarder panel made of ECB liquid crystals.

The foregoing embodiments and advantages are merely exemplary and are not to be construed as limiting this document. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A stereoscopic image display device capable of functioning in a two-dimensional (2-D) image mode and a three-dimensional (3-D) image mode, comprising:
   a display device configured to display a first image data and a second image data in a time-dividing manner;
   a first driving unit configured to control the display device;
   a switchable retarder panel configured to control light emitted from the display device and made of ECB liquid crystals;
   a second driving unit configured to control the switchable retarder panel; and
   polarization glasses configured to pass or block the light emitted from the switchable retarder panel, based on the polarization of the light from the switchable retarder panel, wherein the polarization glasses comprise:
  a left eyeglass, comprising:
    a half-wave plate comprising a slow phase axis tilted 90° with respect to a horizontal axis, and
    a polarizer comprising a light absorbing axis tilted 135° with respect to the horizontal axis, and
  a right eyeglass comprising a polarizer comprising a light absorbing axis tilted 135° with respect to the horizontal axis,
wherein the display device is further configured to emit linearly polarized light,
wherein the switchable retarder panel comprises:
  a common electrode formed in a front glass substrate, and
  scan lines formed in a rear glass substrate,
wherein the scan lines classified into a plurality of groups are formed in the rear glass substrate in a traverse stripe pattern,
wherein the second driving unit is further configured to sequentially supply a switching on or off voltage comprising a three-step voltage level to the scan lines line-by-line in the scan direction of the switchable retarder panel,
wherein the switching off voltage comprises an equipotential as a common voltage supplied to the common electrode of the display device,
wherein the switching on voltage comprises positive and negative polarity voltages with a potential difference with the common voltage supplied to the common electrode of the display device,
wherein the positive and negative polarity voltages are generated based on the common voltage,
wherein the right eyeglass further comprises a compensation plate placed on the polarizer and configured to have a same tilt as the slow phase axis,
wherein the display device comprises:
  data lines formed in a TFT substrate, and
  gate lines formed in the TFT substrate,
wherein the scan lines of the switchable retarder panel and the gate lines of the display device are arranged in the same direction, and
wherein a ratio of scan lines of the switchable retarder panel to gate lines of the display device is 1:N, where N is an even number.

2. The stereoscopic image display device of claim 1, further comprising:
  a control unit configured to supply the display device with left-eye image data and right-eye image data; and
  an image supply unit configured to supply, to the control unit:
    two-dimensional (2-D) image data in the 2-D image mode; and
    right and left three-dimensional (3-D) image data in the 3-D image mode.

3. The stereoscopic image display device of claim 2, wherein the image supply unit is further configured to supply timing signals to the control unit.

* * * * *